(12) United States Patent
Humele et al.

(10) Patent No.: US 8,162,127 B2
(45) Date of Patent: Apr. 24, 2012

(54) DYNAMIC STORAGE FOR OBJECTS

(75) Inventors: Heinz Humele, Thalmassing (DE); Wolfgang Hausladen, Motzing (DE); Bruno Landler, Neutraubling (DE)

(73) Assignee: Krones AG, Neutraubling (DE)

(*) Notice: Subject to any disclaimer, the term of this patent is extended or adjusted under 35 U.S.C. 154(b) by 336 days.

(21) Appl. No.: 12/063,735

(22) PCT Filed: Jul. 7, 2006

(86) PCT No.: PCT/EP2006/006648
§ 371 (c)(1), (2), (4) Date: Jun. 10, 2010

(87) PCT Pub. No.: WO2007/025598
PCT Pub. Date: Mar. 8, 2007

(65) Prior Publication Data
US 2010/0263988 A1    Oct. 21, 2010

(30) Foreign Application Priority Data
Aug. 27, 2005 (DE) .............. 20 2005 013 552 U

(51) Int. Cl.
*B65G 1/00* (2006.01)
(52) U.S. Cl. ............ 198/347.1; 198/812; 198/839
(58) Field of Classification Search ............ 198/347.12, 198/812, 404, 405, 839
See application file for complete search history.

(56) References Cited

U.S. PATENT DOCUMENTS

| | | | |
|---|---|---|---|
| 1,810,419 A | 6/1931 | Francis | |
| 2,788,140 A | 4/1957 | Becker | |
| 2,932,376 A * | 4/1960 | Millington | 198/341.03 |
| 3,297,138 A | 1/1967 | McCombie | |
| 3,575,282 A | 4/1971 | Gaiotto et al. | |
| 3,664,487 A | 5/1972 | Ballenger | |
| 3,968,861 A | 7/1976 | Kernen et al. | |
| 4,018,325 A | 4/1977 | Rejsa | |
| 4,153,858 A | 5/1979 | Schylander et al. | |
| 4,269,299 A | 5/1981 | Goodman | |
| 4,294,345 A | 10/1981 | Stauber et al. | |
| 4,399,909 A | 8/1983 | Gorelik | |
| 4,413,724 A | 11/1983 | Fellner | |
| 4,468,277 A | 8/1984 | Kontz | |
| 4,469,219 A | 9/1984 | Cosse et al. | |

(Continued)

FOREIGN PATENT DOCUMENTS

| | | |
|---|---|---|
| CA | 2364216 | 6/2003 |
| DE | 1080580 | 4/1960 |
| DE | 2610833 | 9/1977 |
| DE | 2618905 | 11/1977 |
| DE | 19824846 | 12/1999 |
| DE | 19928325 | 12/2000 |
| DE | 29913237 | 12/2000 |
| DE | 102004053663 | 8/2005 |
| DE | 202006003690 | 6/2006 |
| DE | 102006012014 | 9/2007 |

(Continued)

OTHER PUBLICATIONS

PCT International Preliminary Report on Patentability and Written Opinion based on International Patent Application No. PCT/EP2006/006648 filed Jul. 7, 2006.

(Continued)

*Primary Examiner* — Mark A Deuble
(74) *Attorney, Agent, or Firm* — Marshall, Gerstein & Borun LLP

(57) ABSTRACT

A dynamic storage for objects having an endless conveyor chain equipped with receptacles for the objects and having at least two contrarotating upper pulleys that are adjustable in height such that the conveyor chain forms two essentially vertical loops whose variable lengths are defined by the upper pulleys, the stationary lower pulleys rotating in essentially horizontal planes and being connected to the essentially vertical loops by curved guides for the conveyor chain.

9 Claims, 2 Drawing Sheets

U.S. PATENT DOCUMENTS

| | | | |
|---|---|---|---|
| 4,513,858 A * | 4/1985 | Fellner et al. | 198/812 |
| 4,549,647 A | 10/1985 | Cosse | |
| 4,565,284 A | 1/1986 | Seragnoli et al. | |
| 4,838,410 A | 6/1989 | Gough | |
| 4,903,823 A | 2/1990 | Plesser et al. | |
| 4,989,718 A | 2/1991 | Steeber | |
| 5,022,609 A | 6/1991 | Cranston | |
| 5,076,422 A | 12/1991 | Clopton | |
| 5,129,506 A | 7/1992 | Gutov et al. | |
| 5,191,959 A | 3/1993 | Leemkuil | |
| 5,413,213 A | 5/1995 | Golz et al. | |
| 5,429,227 A | 7/1995 | Krossmann et al. | |
| 5,465,830 A * | 11/1995 | Tingskog | 198/819 |
| 5,490,589 A | 2/1996 | Golz et al. | |
| 5,620,084 A | 4/1997 | Mensch | |
| 5,645,159 A | 7/1997 | Luginbuhl et al. | |
| 5,722,655 A | 3/1998 | Reist | |
| 5,772,005 A | 6/1998 | Hansch et al. | |
| 5,863,571 A | 1/1999 | Santais et al. | |
| 5,996,322 A | 12/1999 | La Barre | |
| 6,079,541 A | 6/2000 | Bercelli et al. | |
| 6,119,848 A | 9/2000 | Hartness, III et al. | |
| 6,152,291 A | 11/2000 | Steeber et al. | |
| 6,168,004 B1 | 1/2001 | Drewitz et al. | |
| 6,182,812 B1 | 2/2001 | Hartness, III et al. | |
| 6,209,716 B1 | 4/2001 | Bogle et al. | |
| 6,230,874 B1 | 5/2001 | Steeber et al. | |
| 6,241,074 B1 | 6/2001 | Steeber | |
| 6,260,688 B1 | 7/2001 | Steeber et al. | |
| 6,334,528 B1 | 1/2002 | Bogle et al. | |
| 6,354,427 B1 | 3/2002 | Pickel et al. | |
| 6,382,398 B2 | 5/2002 | Steeber et al. | |
| 6,394,260 B1 | 5/2002 | Barth et al. | |
| 6,422,379 B1 * | 7/2002 | Zoppas | 198/803.12 |
| 6,446,781 B1 | 9/2002 | De Villele | |
| 6,497,321 B2 | 12/2002 | Horton et al. | |
| 6,520,318 B1 | 2/2003 | Humele | |
| 6,523,669 B1 | 2/2003 | Steeber et al. | |
| 6,533,103 B2 | 3/2003 | Hartness et al. | |
| 6,550,602 B2 | 4/2003 | Steeber et al. | |
| 6,585,104 B2 | 7/2003 | Horton et al. | |
| 6,591,963 B2 | 7/2003 | Wipf | |
| 6,601,697 B2 | 8/2003 | Steeber et al. | |
| 6,612,420 B1 | 9/2003 | Hartness, III et al. | |
| 6,662,936 B2 | 12/2003 | Ikemoto et al. | |
| 6,698,581 B2 | 3/2004 | Steeber et al. | |
| 6,725,997 B2 | 4/2004 | Draghetti | |
| 6,725,998 B2 | 4/2004 | Steeber et al. | |
| 6,758,321 B2 * | 7/2004 | Spettl | 198/347.1 |
| 6,761,264 B2 | 7/2004 | Steeber et al. | |
| 6,779,651 B1 | 8/2004 | Linglet et al. | |
| 6,817,464 B2 | 11/2004 | Biondi et al. | |
| 6,846,145 B2 | 1/2005 | Remericq | |
| 6,848,563 B2 | 2/2005 | Abert et al. | |
| 6,896,120 B2 | 5/2005 | Barry et al. | |
| 6,959,953 B2 | 11/2005 | Graffin | |
| 6,973,767 B2 | 12/2005 | Wagner et al. | |
| 7,021,452 B2 | 4/2006 | Horton et al. | |
| 7,032,742 B2 | 4/2006 | Hartness et al. | |
| 7,140,870 B2 | 11/2006 | Nava | |
| 7,191,896 B2 | 3/2007 | Hartness et al. | |
| 7,219,788 B2 | 5/2007 | Tuck et al. | |
| 7,264,113 B2 | 9/2007 | Hartness et al. | |
| 7,278,531 B2 | 10/2007 | Hartness et al. | |
| 7,299,832 B2 | 11/2007 | Hartness et al. | |
| 7,311,515 B2 | 12/2007 | Netsu | |
| 7,331,156 B2 | 2/2008 | Hartness et al. | |
| 7,334,677 B2 | 2/2008 | Mader | |
| 7,413,072 B2 | 8/2008 | Horton et al. | |
| 7,431,142 B2 | 10/2008 | Eberle | |
| 7,442,031 B2 | 10/2008 | Netsu | |
| 2002/0053499 A1 | 5/2002 | Zurcher | |
| 2002/0144880 A1 | 10/2002 | Ikemoto et al. | |
| 2002/0195317 A1 | 12/2002 | Wipf | |
| 2003/0085103 A1 | 5/2003 | Horton et al. | |
| 2003/0155212 A1 | 8/2003 | Abert et al. | |
| 2004/0079049 A1 * | 4/2004 | Borderi et al. | 53/148 |
| 2007/0235288 A1 | 10/2007 | Horton et al. | |
| 2008/0142336 A1 | 6/2008 | Kronseder et al. | |
| 2008/0210520 A1 | 9/2008 | Legallais | |
| 2008/0223691 A1 | 9/2008 | Nishi et al. | |
| 2010/0116627 A1 * | 5/2010 | Fege | 198/812 |

FOREIGN PATENT DOCUMENTS

| | | |
|---|---|---|
| EP | 0 506 551 A1 | 3/1992 |
| EP | 0581143 | 2/1994 |
| EP | 0734978 | 10/1996 |
| EP | 1161391 | 12/2001 |
| EP | 1275603 | 1/2003 |
| EP | 1295820 | 3/2003 |
| EP | 1389595 | 2/2004 |
| EP | 1832533 | 9/2007 |
| FR | 2745804 | 9/1997 |
| FR | 2766803 | 2/1999 |
| GB | 1301843 | 1/1973 |
| GB | 2047667 | 12/1980 |
| GB | 2143788 | 2/1985 |
| GB | 2300613 | 11/1996 |
| JP | 61-197376 | 9/1986 |
| JP | 70-46977 | 2/1995 |
| RU | 2160694 | 12/2000 |
| RU | 2198835 | 2/2003 |
| WO | WO-97/09257 | 3/1997 |
| WO | WO 00/43294 | 7/2000 |
| WO | WO-01/10754 | 2/2001 |
| WO | WO 01/98187 A1 | 12/2001 |
| WO | WO-02/072454 | 9/2002 |
| WO | WO 2005/073113 A2 | 8/2005 |
| WO | WO 2007/025598 A1 | 3/2007 |

OTHER PUBLICATIONS

International Search Report and Written Opinion for International Application No. PCT/EP2005/010747 (Nov. 21, 2005).

International Search Report and Written Opinion for International Application No. PCT/EP2005/010747 (Apr. 24, 2007).

International Search Report and Written Opinion for International Application No. PCT/EP2007/000485 (May 7, 2007).

International Preliminary Report on Patentability for International Application No. PCT/EP2007/000485 (Nov. 4, 2008).

International Search Report and Written Opinion for International Application No. PCT/EP2006/006648 (Sep. 25, 2006).

International Search Report and Written Opinion for International Application No. PCT/EP07/05824 (Oct. 8, 2007).

International Preliminary Report on Patentability for International Application No. PCT/EP07/05824 (Feb. 17, 2009).

International Search Report and Written Opinion for International Application No. PCT/EP2005/000942 (Sep. 30, 2005).

International Preliminary Report on Patentability for International Application No. PCT/EP2005/000942 (Oct. 3, 2006).

Non-final Office Action for U.S. Appl. No. 11/663,097 (Apr. 13, 2009).

Non-final Office Action for U.S. Appl. No. 10/588,046 (Nov. 21, 2008).

Final Office Action for U.S. Appl. No. 10/588,046 (Jun. 8, 2009).

International Search Report and Written Opinion for International Application No. PCT/EP2007/000305 (Apr. 19, 2007).

International Preliminary Report on Patentability for International Application No. PCT/EP2007/000305 (Oct. 14, 2008).

Dynac Model 6400 Series General Specification Brochure, 2002, Hartness International, Greenville, SC, US (2 pp.).

Dynac 7000 Series General Specification Brochure 2002, Hartness International, Greenville, SC, US (2 pp.).

Anonymous, "Paternoster", 7 pp., Retrieved from the Internet on Apr. 28, 2008: http://en.wikipedia.org/wiki/Paternoster.

Anonymous, "Paternoster lift, also known as the cyclic elevator", 3 pp., Retrieved from the Internet on Apr. 18, 2008: http:www.dartfordarchive.org/uk/technology/magnified/cyclic_elev.htm.

Dynac 6000 Series Brochure, Hartness International, Greenville, SC, US (2 pages), publicly available at least as early as Jul. 6, 2005.

Dynac Model 7000 Brochure, Hartness International, Greenville, SC, US (2 pages), publicly available at least as early as Jul. 6, 2005.

* cited by examiner

DYNAMIC STORAGE FOR OBJECTS

CROSS REFERENCE TO RELATED APPLICATIONS

The present application claims the benefit of priority of International Patent Application No. PCT/EP20067/006648, filed on Jul. 7, 2006, which application claims priority of German Patent Application No. 20 2005 01 3552.6, filed Aug. 27, 2005. The entire text of the priority application is incorporated herein by reference in its entirety.

FIELD OF THE DISCLOSURE

The disclosure relates to a dynamic storage for objects of the type using an enders conveyor chain.

BACKGROUND

Such a storage is already known in which the lower pulleys, which are also driving wheels at the same time, rotate in vertical planes and the conveyor chain runs directly in four vertical lines between the two lower pulleys and the two upper pulleys (EP 506 551 B1). Despite the great storage capacity, the ground area required for this storage is relatively minor due to the vertical extent of the two loops. However, when loading and unloading the conveyor chain, objects which are usually fed and removed horizontally are subjected to abrupt changes of speed and direction, so that a high output cannot be achieved and the possibility of damage to the objects cannot be ruled out.

Furthermore, there is a known dynamic storage for objects in which the contrarotating pulleys and the loops formed by them are part of an endless conveyor belt running in parallel horizontal planes (WO 01/98 187 A1). Loading and unloading of the horizontal conveyor tower of the conveyor belt does not pose any problems here but the enormous space required due to the horizontal extent of the two loops is a disadvantage.

SUMMARY OF THE DISCLOSURE

The object of the present disclosure is to tangibly improve upon the loading and unloading options in the case of a generic dynamic storage and to do so with minimal complexity and expense.

With the disclosed storage a continuous supply and removal of objects in the horizontal direction is made possible without any mentionable increase in ground area in the area of the two pulleys rotating horizontally, such that the actual storage still takes place in the area of the vertical loops.

BRIEF DESCRIPTION OF THE DRAWINGS

An exemplary embodiment of the disclosure is described below on the basis of the drawings, in which.

Figure 1:
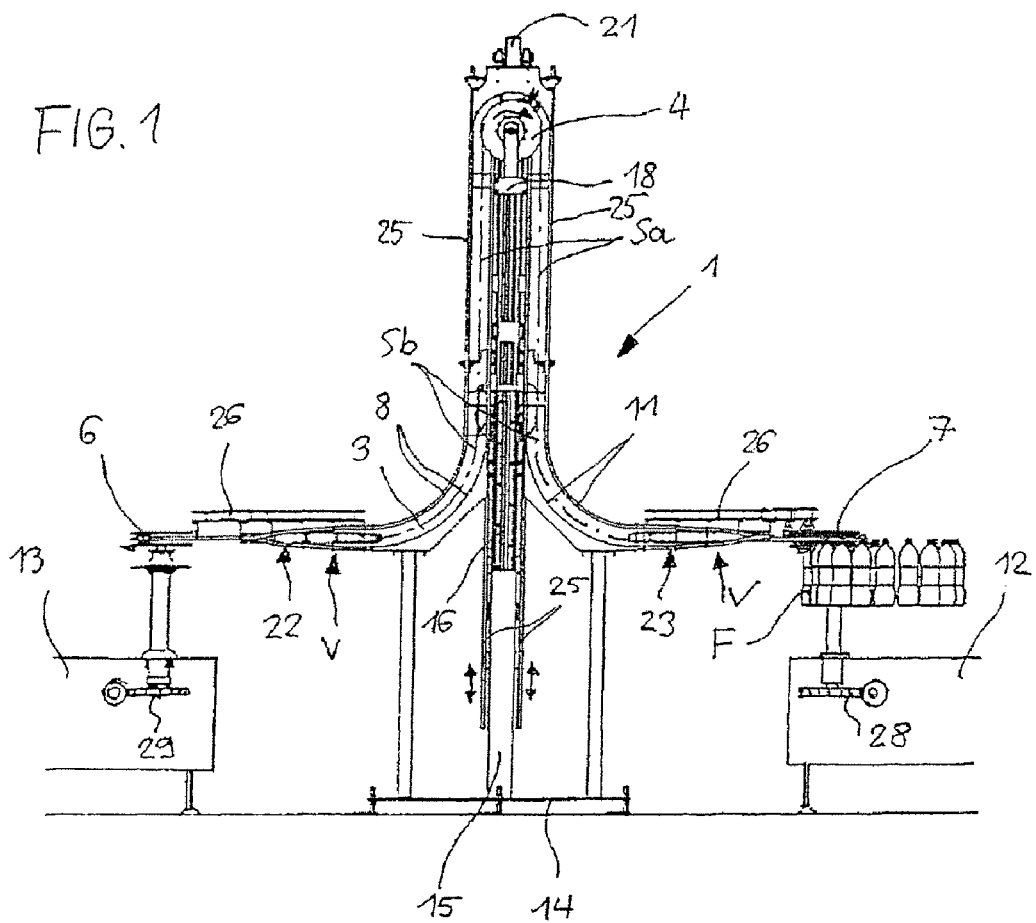
FIG. 1 shows a side view of a dynamic storage
Figure 2:
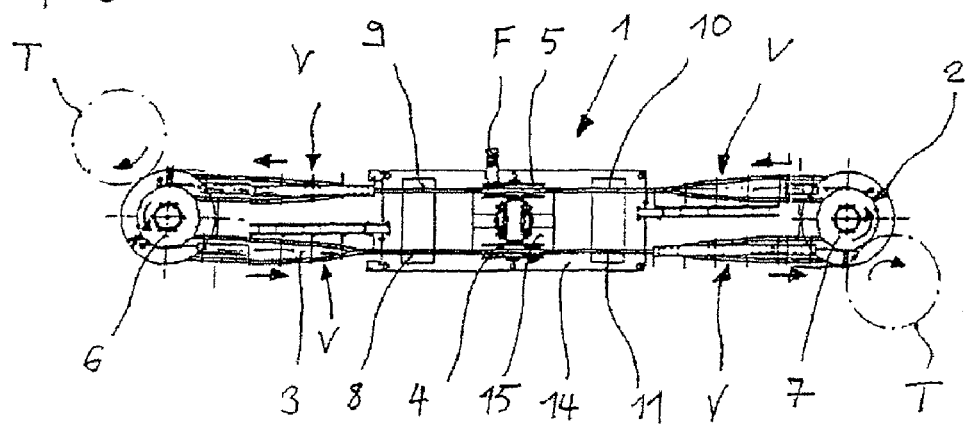
FIG. 2 shows an overhead view of the storage according to FIG. 1
Figures 3, 4:
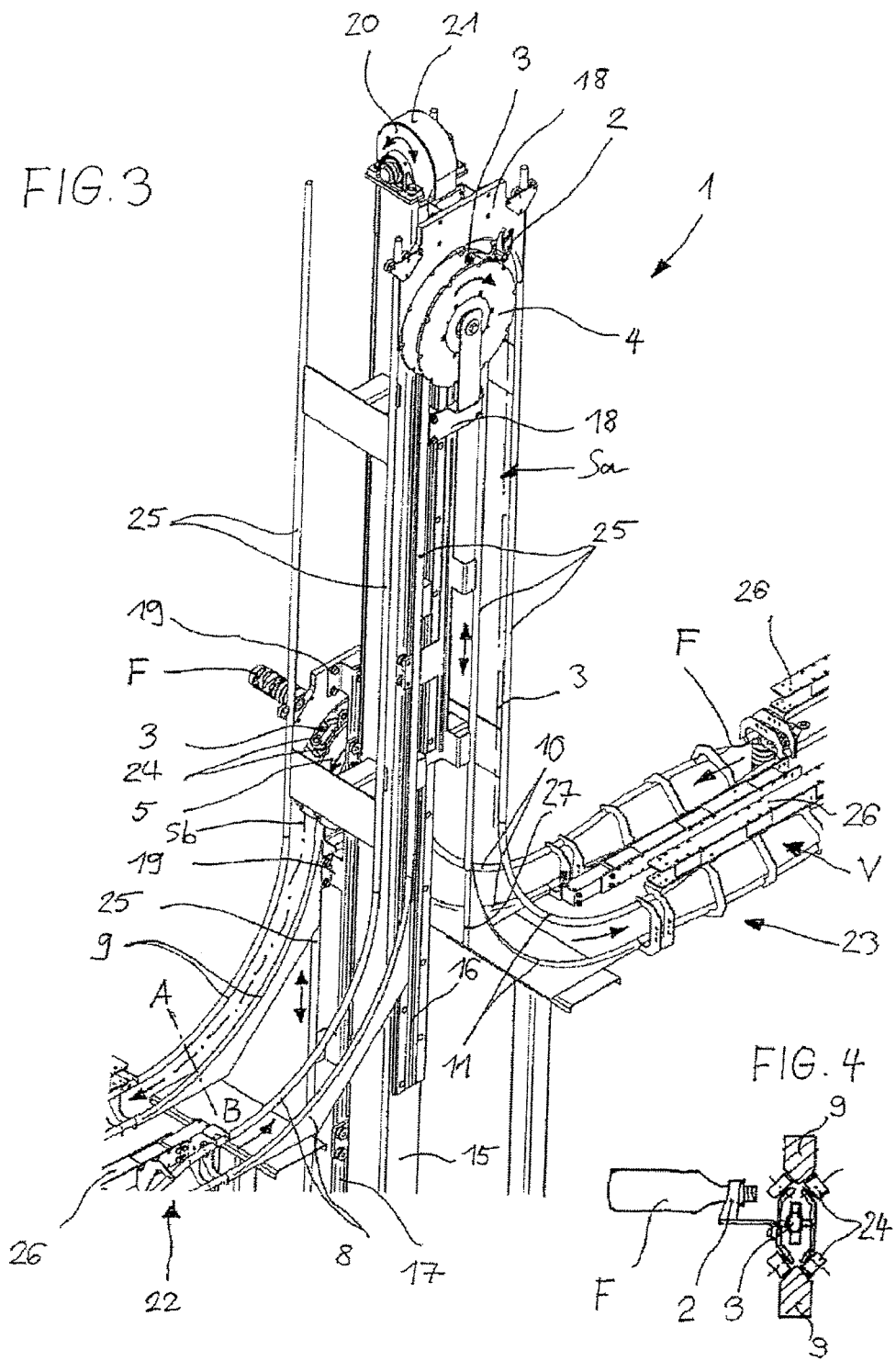
FIG. 3 shows an enlarged perspective view of the two loops of the storage according to FIGS. 1 and 2
FIG. 4 shows the section AB according to FIG. 3.

The storage 1 according to FIGS. 1 through 4 is equipped for dynamic buffering and conveyance of empty bottles F made of PET between two treatment machines, e.g., a labeling machine 12 and a filling and closing machine 13. It has a base plate 14 that stands on the floor with a perpendicular pillar 15 and with a vertical linear guide 16, 17 attached to its front and back sides each. A roller-supported carriage 18, 19 with one upper pulley 4, 5 each runs on each linear guide 16, 17. Each pulley 4, 5 is freely rotatable with a horizontal axis of rotation and/or a vertical plane of rotation and is mounted on the respective carriage 18, 19. A pulley 20 with a horizontal axis of rotation is mounted to rotate freely at the upper end of the pillar 15 with a belt 21 running downward from it on both sides. The one end of the belt 21 is attached to the front carriage 18 and the other end is attached to the rear carriage 19. Any movement in height of the two carriages 18, 19 and the upper pulleys 4, 5 mounted on them is thus necessarily contrarotating and synchronized.

DETAILED DESCRIPTION

Furthermore, two horizontal cantilevered arms 22, 23 are attached to the base plate 14, extending diametrically away from the pillar 15 and away from the side between the linear guides 16, 17, supporting a lower pulley 6, 7 with a vertical axis of rotation and/or a horizontal plane of rotation on each of its free ends. The two cantilevered arms 22, 23 together with the vertical pillar 15 form a symmetrical cross.

An endless conveyor chain 3, only a few links of which are shown here, runs in the direction of the arrow over the two lower pulleys 6, 7 and the two upper pulleys 4, 5. The links are joined by a universal joint and each has a side receptacle 2 for a bottle F in the form of elastic gripper tongs which secure the bottles in a frictionally engaged and form-fitting manner beneath the collar. Furthermore, each chain link is equipped with four guide rolls 24, the function of which is explained below.

In addition to the four pulleys 4 through 7, the conveyor chain 3 is guided by four curved guides 8 through 11 in the manner of a quarter circle, each arranged in pairs and so they coincide (as seen from the front) in the upper wedge between the vertical pillar 15 and the horizontal cantilevered arms 22, 23. The two front guides 8 and 11 are situated in the same vertical plane in which the front upper pulley 4 rotates. Accordingly the two rear guides 9 and 10 are situated in the same vertical plane in which the rear upper pulley 5 rotates. The two planes are parallel to one another with a distance corresponding to the horizontal distance between the two upper pulleys 4, 5. In these two planes the conveyor chain 3 is guided by the front guides 8 and 11 and the front upper pulley 4 in a front vertical loop Sa and by the rear guides 9, 10 and the rear upper pulley 5 in a rear vertical loop Sb.

The distance between the two planes with the loops Sa, Sb corresponds in this exemplary embodiment approximately to the diameter of the lower pulleys 6, 7 which are in turn situated in a shared horizontal plane in which the conveyor chain 3 is guided by means of the lower pulleys 6, 7 between the two vertical planes. The conveyor chain 3 passes through a short horizontal section between the guides 8 through 11 and the lower pulleys 6, 7; this section has nothing to do with the actual dynamic storage function but instead bridges the given distance between the labeling machine 12 and the filling and closing machine 13. These straight paths may also be omitted. Furthermore, as in the exemplary embodiment shown here, they may be designed as winding paths V to alter the spatial orientation of the conveyor chain 3 by 90□, for example. In the present exemplary embodiment, this is used to convey the bottles F in the area of the vertical loops Sa, Sb with a horizontal central axis and in the horizontal area of their conveyance path with a vertical central axis. This has the advantage that the bottles F can be supplied and removed in the area of the lower pulleys 6, 7 in their normal position by conventional conveyance means such as conveyor stars T with controlled clamps which push the bottles F into the elastic receptacles 2 and remove them from the receptacles. To prevent shimmying of the conveyor chain 3 in the area between the pulleys and the guides, vertical and/or horizontal guide rods 25 may be provided in pairs, gripped by the guide rolls 24 of the chain links. The guide rods 25 are arranged in stationary positions except for the inner vertical guide rods 25 in the area of the two loops Sa, Sb. These are attached in pairs to the respective carriage 18, 19 and thus also execute its movement in height (indicated by double arrows). The guides 8 through 11 are shaped from solid sections to increase their stability and together with the adjacent guide rods 25 and their supporting sections 26, they form the cantilevered arms 22, 23. They are provided on their upper end faces with groove-like recesses 27 with which the guide rods 25 that are adjustable in height engage.

The lower pulleys 6, 7 are at the same time the driving wheels for the conveyor chain 3. To this end the pulley 7 is connected by a gear 28 to the drive for the labeling machine 12 or it has its own motor which runs in synchronization with the labeling machine 12. Accordingly, the pulley 6 is connected by a gear 29 to the drive of the filling and closing machine 13 or it has its own motor which runs in synchronization with the filling and closing machine 13.

In normal operation when labeling machine 12 and filling and closing machine 13 are operating at the same output, the lower pulleys 6, 7 rotate in the direction of the arrow at the same speed. The upper pulleys 4, 5 maintain their instantaneous position. The labeled bottles F are pressed into the receptacles 2 of the conveyor chain 3 in the upright normal position one after the other in order by the discharge star T, then are turned 90□ into a horizontal position in the area of the right cantilevered arm 23, passing through the rear loop Sb in a horizontal position, then are turned back into their normal vertical position in the area of the left cantilevered arm 22 and finally are removed in order from the receptacles 2 of the conveyor chain 3 by the feed star T of the filling and closing machine 13 which is equipped with gripper elements that are not shown here. The loose side of the conveyor chain 3 then rotates in the opposite direction back to the pulley 7 via the front loop Sa.

If the lower pulleys 6, 7 rotate at different speeds due to a difference in output of the labeling machine 12 and the filling and closing machine 13, then the lengths of the two loops Sa and Sb automatically change in opposite directions and the number of bottles F in the rear loop Sb becomes greater or smaller. The differences in output of the labeling machine 12 and the filling and closing machine 13 are thus dynamically buffered. The situation is similar in shutdown of one of the two lower pulleys 6, 7 because of stoppage of the labeling machine 12 or the filling and closing machine 13. In both cases the dynamic storage capacity is defined by the difference between the minimal and maximal lengths of the conveyor chain 3 and/or the number of receptacles 2 in the rear loop Sb. The rear loop Sb is preferably operated in the range of minimal length during normal operation, so that when there is a sudden stoppage of the filling and closing machine 13, the labeling machine 12 can be run until it is empty with no problem before it is also stopped. In doing so the rear carriage 19 moves with the pulley 5 out of the lower position shown in FIGS. 1 and 3 into its upper position and the front carriage 18 with the pulley 4 conversely moves out of its upper position into its lower position.

The invention claimed is:

1. Dynamic storage (1) for objects (F), comprising an endless conveyor chain (3) equipped with receptacles (2) for the objects, at least two contrarotating upper pulleys (4, 5) that are adjustable in height, at least two stationary lower pulleys (6, 7), the conveyor chain forming two essentially vertical loops (Sa, Sb) whose variable length is defined by the upper pulleys, and the lower pulleys (6, 7) rotating essentially in horizontal planes and being connected to the essentially vertical loops (Sa, Sb) by curved guides (8, 9, 10, 11) for the conveyor chain (3).

2. Dynamic storage according to claim 1, wherein the lower pulleys (6, 7) rotate in the same horizontal plane.

3. Dynamic storage according to claim 1, wherein the curved guides (8, 9, 10, 11) are each arranged in the same vertical plane as the respective loop (Sa, Sb).

4. Dynamic storage according to claim 1, wherein, between the lower pulleys (6, 7) and the curved guides (8, 9, 10, 11), winding paths (V) for the conveyor chain (3) are inserted.

5. Dynamic storage according to claim 1, and vertical guide rods (25) for the conveyor chain (3) are attached to carriages (18, 19), the guide rods (25) being adjustable in height and on which the upper pulleys (4, 5) are mounted so the upper pulleys (4, 5) are freely rotatable.

6. Dynamic storage according to claim 1, wherein the conveyor chain (3) has a plurality of links that are movable with respect to one another by means of a universal joint, each link having has a receptacle (2) and four guide rolls (24) which grip the guides (8, 9, 10, 11) and optionally grip the guide rods (25) in pairs.

7. Dynamic storage according to claim 1, wherein the receptacles (2) are designed as elastic neck grippers for the bottle-shaped objects (F).

8. Dynamic storage according to claim 6, wherein the conveyor chain (3) is guided in the area of the loop (Sb) in such a way that the central axes of the bottle-shaped objects (F) are aligned essentially horizontally.

9. Dynamic storage according to claim 7, wherein the conveyor chain (3) is guided in the area of the lower pulleys (6, 7) in such a way that the central axes of the bottle-shaped objects (F) are aligned essentially vertically.

\* \* \* \* \*